UNITED STATES PATENT OFFICE.

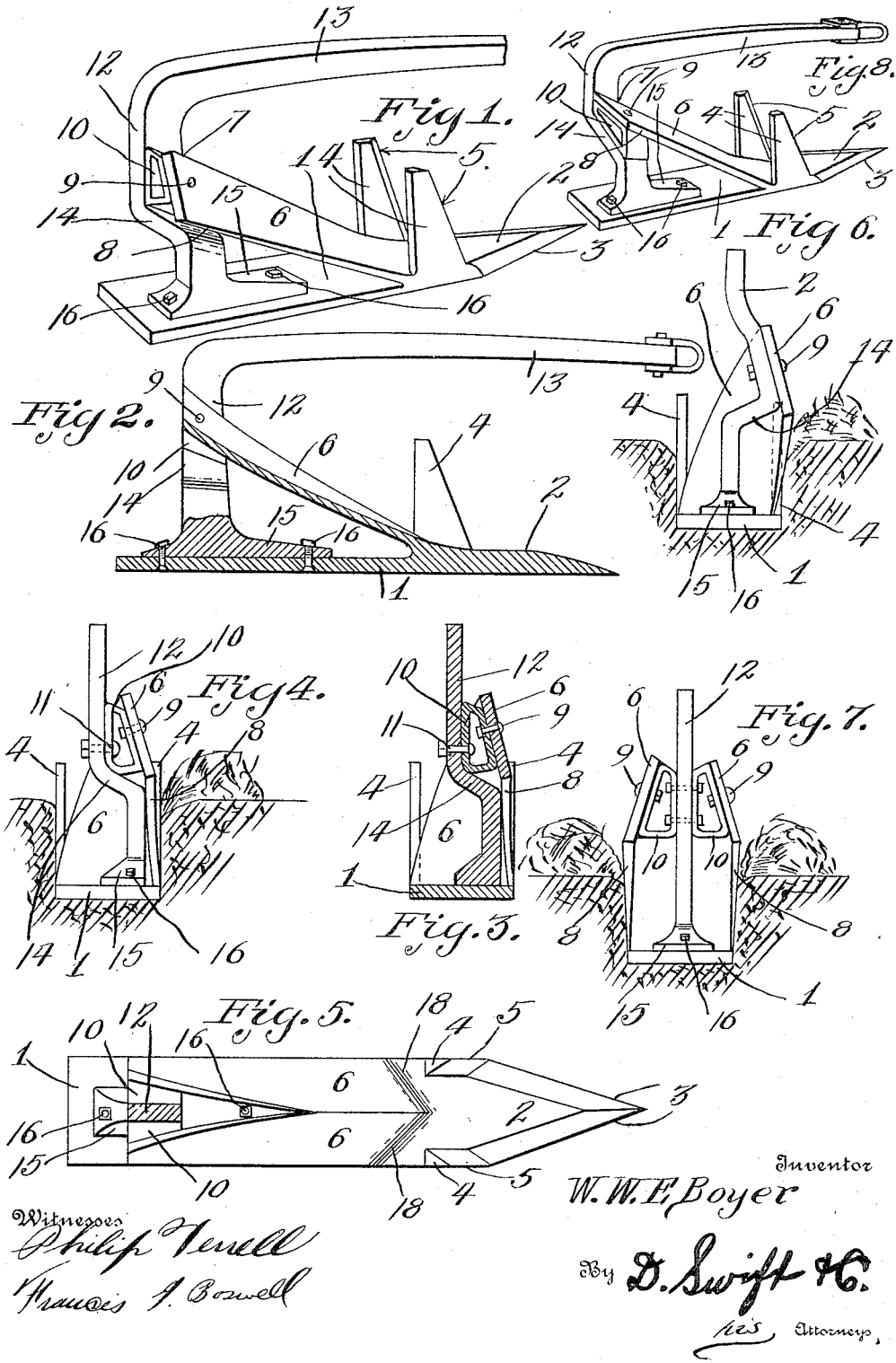

WILLIAM WILBER E. BOYER, OF OKLAHOMA, OKLAHOMA.

CULTIVATOR OR PLOW ATTACHMENT.

1,139,840.   Specification of Letters Patent.   Patented May 18, 1915.

Application filed August 20, 1914. Serial No. 857,620.

*To all whom it may concern:*

Be it known that I, WILLIAM WILBER E. BOYER, a citizen of the United States, residing at Oklahoma, in the county of Oklahoma and State of Oklahoma, have invented a new and useful Cultivator or Plow Attachment; and I do hereby declare the following to be a full, clear, and exact description of the invention, such as will enable others skilled in the art to which it appertains to make and use the same.

This invention relates to an improved cultivator or plow implement, and designed more particularly for cultivating alfalfa and the like.

An object of the invention is the provision of a flat cutting member for cutting the bottom of a furrow having a pair of vertically disposed cutting blades upon the sides for cutting the sides of the furrow, and a mold board gradually inclined rearwardly and upwardly from the flat cutting member, all of said parts being constructed in one casting. By this construction of implement, the furrow may be cut at the bottom and on the sides, and elevated by the mold board and thrown to one side of the furrow.

In practical fields the details of construction may necessitate alterations, falling within the scope of what is claimed.

The invention comprises further features and combination of parts, as hereinafter set forth, shown in the drawings and claimed.

In the drawings:—Figure 1 is a perspective view of the implement constructed in accordance with the invention. Fig. 2 is a sectional view longitudinally through the implement. Fig. 3 is a transverse view in section, showing the implement in the act of cutting the furrow. Fig. 4 is a rear view. Fig. 5 is a plan view, illustrating the mold board so constructed as to act to throw the earth upon both sides of the furrow, which is a modification of the invention. Fig. 6 is a rear view showing the block 10 dispensed with. Fig. 7 is a rear view of the form shown in Fig. 5. Fig. 8 is a perspective view of another form of construction, in which the twist of the mold board is eliminated.

Referring to the drawings, 1 designates a flat elongated base member having a forward V-shaped end 2 provided with cutting edges 3. Rising from the opposite edges adjacent to the termination of the cutting edges of the V-shaped end 2 are vertical cutting blades 4, the cutting edges 5 of which are inclined as shown. Extending rearwardly and upwardly is a mold board 6, and as shown in all the figures except Fig. 5, this mold board where it merges into the flat base member is substantially horizontal, and as it extends rearwardly and upwardly it gradually twists, or is so shaped that the edge 7 is almost above the edge 8, and adjacent the rear upper end of this mold board a bolt 9 passes therethrough and into one wall of a hollow block or holder and provided with a nut to secure the mold board to the block 10. This block is in turn bolted at 11 to the vertical post 12 of the plow beam 13. The vertical post 12 adjacent the lower edge 8 of the mold board is provided with an angular twist or offset portion 14, and above this portion the hollow block 10 is secured. The lower portion of the post or leg of the plow beam terminates in an elongated enlargement 15 constituting a foot which is secured at 16 to the base cutting member 1. The base member 1 and the cutting blades 4 and the mold board are all constructed in one casting.

In Fig. 5 where the mold board joins the base member 1, it is so shaped as shown at 18 that the earth may be thrown to both sides of the furrow.

In Fig. 6 the vertical post or leg 12 has its angular portion 14 disposed just the opposite to that shown in the other figures, so that the rear upper portion of the mold board is disposed somewhat to one side above the furrow, so as to throw the earth completely to one side.

In Fig. 8 the mold board is shown as rising absolutely flatwise and exactly rearwardly, without any twist.

The invention having been set forth, what is claimed as new and useful is:—

1. In a device as set forth, a plow beam post having a foot at its lower end, a flat base cutting member having a V-shaped forward end provided with cutting edges, cutting blades rising vertically from and forming an integral part of the base cutting member and disposed diametrically opposite one another and provided with forward inclined cutting edges, a mold board merging into and forming an integral part with the base cutting member adjacent the vertical cutting members, said mold board extending upwardly and rearwardly and rising flatwise from the base member, means for supporting the rear upper portion of the mold board in a lateral position above the furrow, and means for fastening the mold board to the plow beam post.

2. A plow comprising a flat base cutting member having a V-shaped forward end provided with cutting edges; cutting blades, one upon each side of the base rising vertically from and forming an integral part of the base cutting member adjacent the terminus of each cutting edge of the V-shaped forward end, said vertically rising blades being disposed directly opposite one another and provided with downwardly and forwardly cutting edges, said vertically rising blade being in parallelism; a mold board merging into and forming an integral part with the base cutting member, immediately adjacent where the vertically rising blade connect to the base, said mold board extending upwardly and rearwardly from the base cutting member; and means between the rear upper end of the mold board and the base cutting member for supporting the mold board in a position above the furrow.

In testimony whereof I have signed my name to this specification in the presence of two subscribing witnesses.

WILLLAM WILBER E. BOYER.

Witnesses:
C. G. MITCHELL,
CHAS. PHIFER.

Copies of this patent may be obtained for five cents each, by addressing the "Commissioner of Patents, Washington, D. C."